(12) United States Patent
Cote

(10) Patent No.: US 8,720,864 B2
(45) Date of Patent: May 13, 2014

(54) FIFTH WHEEL HITCH REMOVAL DEVICE

(71) Applicant: Kenneth Cote, Hutchinson, MN (US)

(72) Inventor: Kenneth Cote, Hutchinson, MN (US)

( * ) Notice: Subject to any disclaimer, the term of this patent is extended or adjusted under 35 U.S.C. 154(b) by 0 days.

(21) Appl. No.: 13/743,835

(22) Filed: Jan. 17, 2013

(65) Prior Publication Data
US 2013/0181426 A1 Jul. 18, 2013

Related U.S. Application Data

(60) Provisional application No. 61/587,456, filed on Jan. 17, 2012.

(51) Int. Cl.
B66D 1/36 (2006.01)
(52) U.S. Cl.
USPC .......................... 254/323; 414/496; 280/433

(58) Field of Classification Search
USPC .................... 254/323, 235; 414/496; 280/433
See application file for complete search history.

(56) References Cited

U.S. PATENT DOCUMENTS

| 2,604,302 | A | * | 7/1952 | Francis | 254/266 |
| 5,085,408 | A | * | 2/1992 | Norton et al. | 254/325 |
| 6,951,345 | B2 | * | 10/2005 | Wilks | 280/477 |
| 7,503,549 | B2 | * | 3/2009 | Maturino | 254/338 |
| 2007/0284560 | A1 | * | 12/2007 | Maturino | 254/362 |

* cited by examiner

Primary Examiner — Kevin Hurley
(74) Attorney, Agent, or Firm — Greg N. Geiser; Geiser Law, PLLC

(57) ABSTRACT

A device is provided to install and remove a fifth wheel hitch from a vehicle. This device includes an attachment bar connected to the kingpin of a fifth wheel trailer. The attachment bar is in communication with an extension arm. The extension arm includes a hoist with a cable to be attached to the fifth wheel hitch. Operation of the hoist will lift or lower the fifth wheel hitch to its desired position.

10 Claims, 3 Drawing Sheets

FIFTH WHEEL HITCH REMOVAL DEVICE

CROSS REFERENCE TO RELATED APPLICATIONS

This application claims the benefit of provisional patent application Ser. No. 61/587,456 filed 2012 Jan. 17 by the present inventor.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

Recreational camping is a popular activity allowing individuals to see other parts of the world without the added expense of lodging. The camper trailer has become one way to easily establish living quarters without the hassle of setting up a tent or other temporary structure. Camping trailers come in several varieties and varying sizes. Of these varieties one of the more popular styles is the "fifth wheel" camping trailer. The fifth wheel is popular due to its ease of trailering relative to its size. Fifth wheel style trailers come in several different sizes with varying amenities. Typically, a fifth wheel camping trailer is found in lengths ranging from 20 feet to 40 feet with the most popular lengths 32 feet, 34 feet, and 36 feet.

The hitch present on a fifth wheel trailer is a gooseneck hitch with a king pin. For towing, this king pin is engaged in a fifth wheel hitch that is mounted on the towing vehicle. Most commonly, this towing vehicle is a pickup truck with a fifth wheel hitch mounted in its bed.

Upon arriving at a campsite, a user will maneuver the trailer to its location and then detach the trailer from the hitch. This allows the user to use their vehicle without having to tow the trailer. Often, individuals will stay at a campsite for several days. Throughout this stay, the fifth wheel hitch is often left in the bed of the pickup as it is difficult to remove due to its size and weight. Although the fifth wheel hitch is often left in the bed of the pickup truck, it is desired that this hitch be removed to allow for the use of the bed of the pickup truck. Currently to remove a fifth wheel hitch, the user is required to find several people to help lift the hitch out of the truck. Therefore, there is a need for a universal device that easily removes and reinstalls the fifth wheel hitch from the pickup truck. It is particularly desired that this device be universal for use on most fifth wheel trailers, be portable, and be operated by one individual.

SUMMARY OF THE INVENTION

The present invention relates to a fifth wheel hitch removal and reinstallation device for use in removing and reinstalling a fifth wheel hitch attached to a vehicle. This device utilizes the king pin of a fifth wheel trailer as the mounting point, allowing it to be used for multiple designs and brands of fifth wheel trailers. The device includes a main attachment bar with a first end and a second end, an extension arm, a hoist, and a cable. The attachment bar is affixed to the king pin of the fifth wheel trailer at its first end and extends outward towards the front of the trailer culminating in a second end distal the first end. The second end includes an aperture to receive a hinge pin or bolt to secure the extension arm to the attachment bar.

The extension arm has a first end and second end. The first end in hinged communication with the second end of the attachment bar, wherein the extension arm inclines upward and away from the trailer. The second end of the extension arm includes an attachment point for the hoist. A cable is attached to the hoist dropping perpendicular to the attachment arm. The end of the cable can be attached to a lifting strap or other device attached to the hitch to easily lift the fifth wheel hitch off of the vehicle when the hoist is operated.

BRIEF DESCRIPTION OF THE SEVERAL VIEWS OF THE DRAWING(S)

The accompanying drawings are included to provide a further understanding of the present invention and are incorporated in and constitute a part of this specification. The drawings illustrate exemplary embodiments of the present invention and together with the description serve to further explain the principles of the invention. Other aspects of the invention and the advantages of the invention will be better appreciated as they become better understood by reference to the Detailed Description when considered in conjunction with accompanying drawings, and wherein.

DETAILED DESCRIPTION OF THE INVENTION

Figure 1:
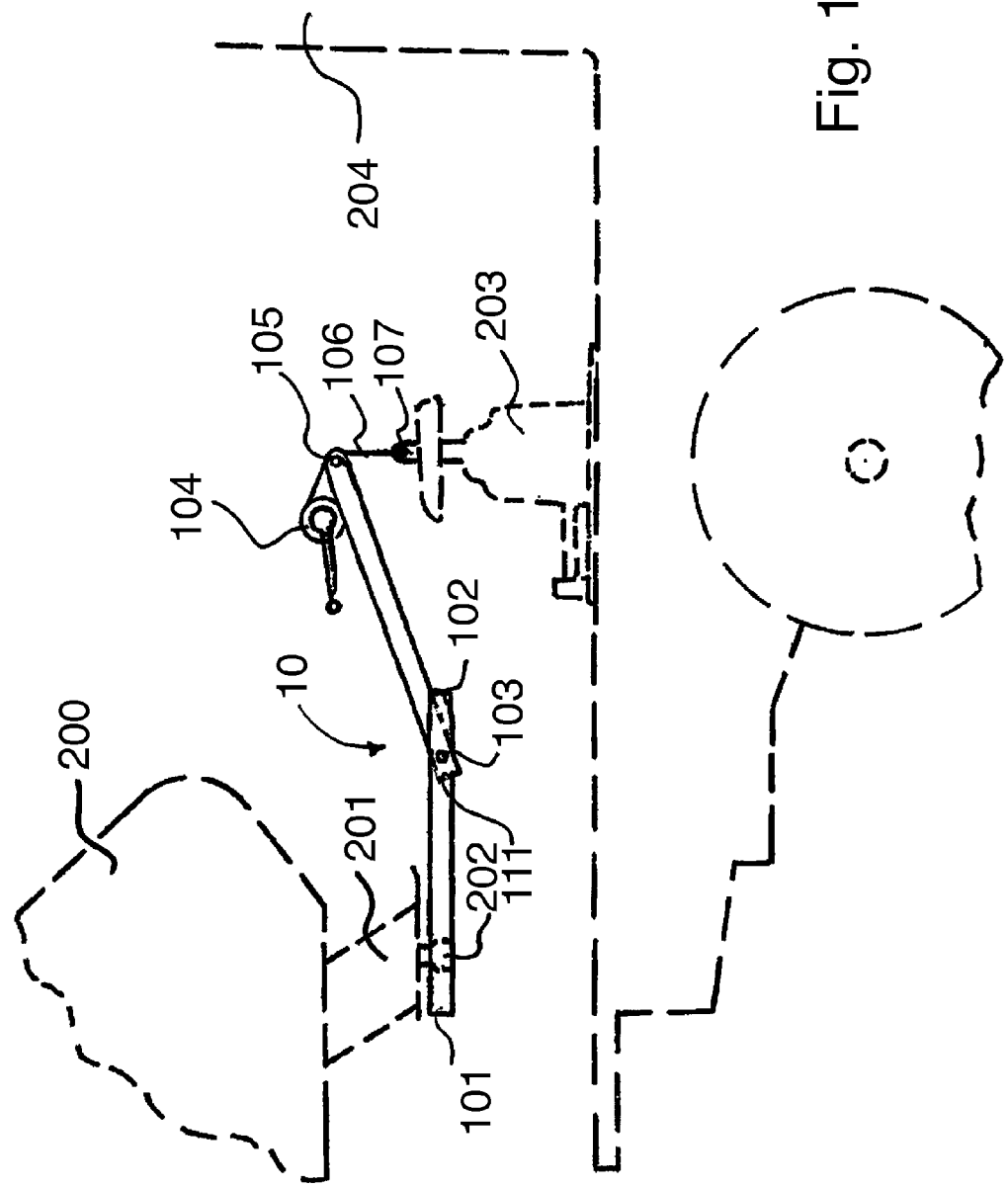
FIG. 1 is a side view of the device attached to a trailer, according to the present invention.
Figure 2:
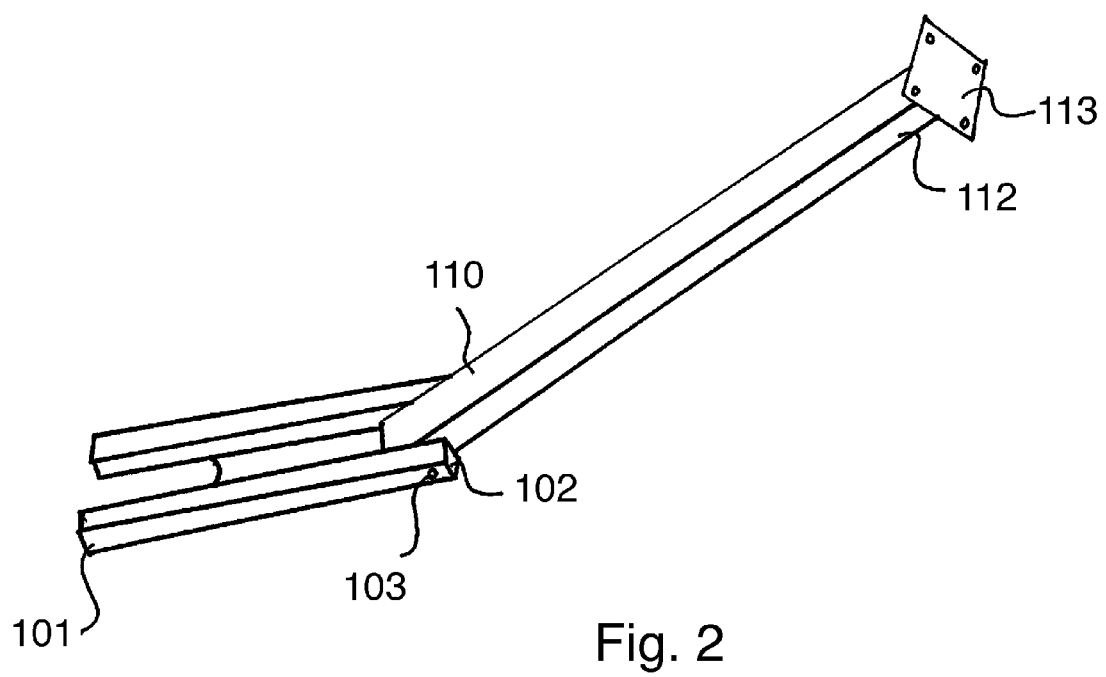
FIG. 2 is an isometric top view of the device, according to the present invention.
Figure 3:
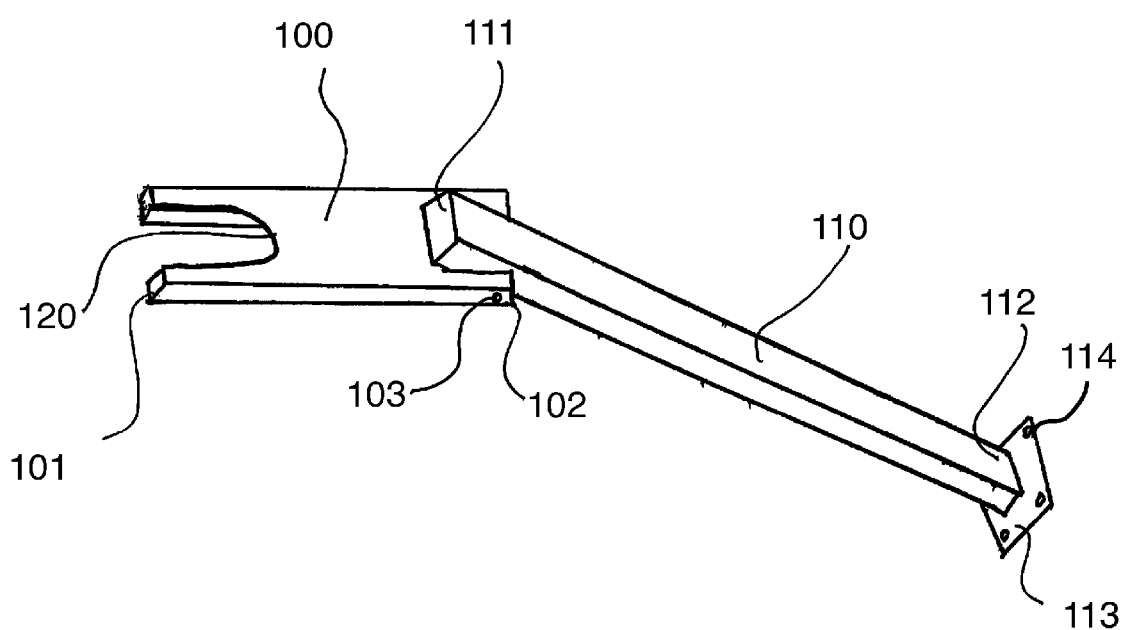
FIG. 3 is an isometric bottom view of the device, according to the present invention.

Referring now to FIG. 1 - FIG. 3, the fifth wheel hitch installation and removal device generally referred to as 10, there is shown the front end of a fifth wheel trailer 200 with a goose neck hitch 201 containing a king pin 202 with the device 10 affixed to the king pin 202. The device 10, after being affixed to the king pin 202, will allow a user to remove or install a fifth wheel hitch 203 from a vehicle 204. This device 10 is easily stored within the fifth wheel trailer or the vehicle and will allow a user to easily remove the fifth wheel hitch 203 from their vehicle 204 utilizing their existing fifth wheel trailer 200 from any location.

The device 10 includes an attachment bar 100, an extension arm 110, and a hoist 104. The attachment bar 100 has a first end 101 and a second end 102 and extends outward opposite the trailer 200 living space and parallel to the hitch 201. The first end 101 is removably attached and in frictional communication with the king pin 202, wherein the dimensions of the king pin 202 retain the first end 101 to the gooseneck hitch 201. Preferably, the first end 101 is bifurcated culminating in a plate end 120 and sized to sandwich the device 10 between the king pin 202 and the gooseneck hitch 201. This fastening will allow for horizontal rotation of the device 10 to allow for the easy alignment of the fastening holes during reinstallation of the fifth wheel hitch 203. The second end 102 may include an aperture to receive a hinge pin 103 connecting the attachment bar 100 and the extension arm 110.

The extension arm 110 has a first extension end 111 and a second extension end 112 opposite the first extension end 111. The first extension end 111 is in communication with the attachment bar 100 second end 102 and forming a joint wherein the extension arm 110 is inclined upward and away from the trailer 200 culminating in the second extension end 112. The attachment bar 100 and the extension arm 110 can be permanently affixed in a single piece or be a combination of two separate pieces hingedly connected.

The extension arm 110 second extension end 112 includes an attachment point for the hoist 104. The hoist 104 may be manual or electric. A cable 106 is attached to the hoist 104 at one end and culminates in a free cable end 107 opposite the end attached to the hoist 104. The free cable end 107 may include any number of attachments to facilitate the use of the hoist and the lifting or lowering of a fifth wheel hitch. These attachments may include a snap ring, carabineer, tow strap, a kingpin, or other similar attachment means. A guide wheel 105 may be used to control the cable during lifting and lowering of the fifth wheel hitch.

In the preferred embodiment of the present invention, the hoist 104 will be mounted to a plate 113 at the second extension end 112. The plate 113 will include apertures 114 to aide in the mounting of the hoist 104 to the device 10.

In the preferred embodiment of the present invention, the attachment bar 100 will have a hinge 103 that transitions the attachment bar 100 from horizontal to the inclined extension arm 110. This will result in a height of the second extension end 112 greater than the first end 101 relative to the ground. This hinge 103 allows the user the ability to easily lift the fifth wheel hitch 203 out of the vehicle without having to worry about damaging the vehicle. Additionally, the added height allows for easily manipulation of the fifth wheel hitch 203 during reinstallation.

It is preferred that the length of travel the device 10 is 48 inches from the center of the king pin 202 to the second extension end 112 with the attachment bar 100 extending a length of 12 inches to the hinge 103 and the extension arm 110 extending a length of 36 inches. These dimensions will provide for angle of 14.5° relative to the attachment bar position parallel to the ground. This angle and dimensions will create an added height of 12 inches to the second extension end 112 relative to the first end 101.

It is preferred that the hoist 104 include a safety mechanism to prevent overloading of the hoist and attachment bar 100. Preferably the lifting capacity of the device is 500 pounds. Anticipated safety devices may be a release mechanism, safety brakes, or other safety mechanisms known within the art. It is also preferred that the device is constructed out of steel and that all the critical joints are welded to ensure safe operation.

In use to remove or install a fifth wheel hitch to a vehicle, a user will detach the trailer from the fifth wheel hitch and pull the vehicle forward away from the trailer. The user will then attach the device 10 to the king pin 202 of the fifth wheel trailer 200 utilizing the appropriate fastener. The user will then back the up towards the device 10 aligning the cable end 107 with the fifth wheel hitch 203. The user will then attach the cable end 107 to the fifth wheel hitch 203 utilizing the appropriate attachment. The user will then unfasten the fifth wheel hitch 203 from the vehicle 204. The user will then operate the hoist 104 to lift the fifth wheel hitch 203 out of the vehicle 204. The user will then pull the vehicle 204 forward and away from the device 10. The user will then lower the fifth wheel hitch 203 to the ground or transfer it to another location for storage.

What is claimed is:

1. An apparatus for installing and removing a fifth wheel style trailer hitch from a vehicle, the apparatus comprising, in combination:
    a fifth wheel trailer having a gooseneck style hitch with a king pin;
    a attachment bar, the attachment bar being planar and horizontally orientated, the attachment bar removably received between the king pin and the gooseneck style hitch, the attachment bar having:
        a first end, the first end sized to be sandwiched between the king pin and the gooseneck hitch; and
        a second end, the second opposite the first end;
    a extension arm, the extension arm affixed to the attachment arm second end, the extension arm inclined from the attachment bar, the extension arm having:
        a first extension end, the first extension end affixed to the second end; and
        a second extension end, the second extension end opposite the first extension end;
    a hinge, the hinge connecting the attachment bar and the extension arm; and
    a hoist, the hoist attached to the second extension end, the hoist having a cable, the cable having a free end and an attached end, the attached end affixed to the hoist, wherein the cable can be attached to a fifth wheel hitch and manipulated using the hoist.

2. The apparatus as in claim 1, wherein the attachment bar first end is bifurcated, with the forks of the bifurcation being spaced to be received around a shaft of the king pin and retained by a head of the king pin.

3. The apparatus as in claim 1, wherein the second extension end has a plate, the plate having a plurality of apertures for the attachment of the hoist.

4. The apparatus as in claim 1, wherein the attachment bar and extension arm are one piece.

5. The apparatus as in claim 1, wherein the attachment bar and extension arm are two separate pieces.

6. The apparatus as in claim 1, wherein the incline between the attachment bar and extension arm is inclined 14.5 degrees.

7. The apparatus as in claim 1, wherein the hoist is electric.

8. The apparatus as in claim 1, wherein the hoist is manual.

9. A method for removing a fifth wheel hitch from a vehicle using a apparatus affixed to a goose neck hitch on a fifth wheel trailer, the method comprising:
    a. removing the fifth wheel camping trailer from the fifth wheel hitch of the vehicle;
    b. affixing the apparatus to the king pin on the goose neck hitch of the fifth wheel camping trailer;
    c. aligning the fifth wheel hitch on the vehicle with an end of the apparatus;
    d. connecting a cable present on the apparatus to the fifth wheel hitch on the vehicle;
    e. unfastening the fifth wheel hitch from the vehicle;
    f. using the apparatus to raise the fifth wheel hitch;
    g. moving the vehicle;
    h. lowering the fifth wheel hitch to the ground;
    i. to reattach, reverse the process.

10. The method of claim 9, wherein the apparatus comprises:
    a attachment bar, the attachment bar being planar and horizontally orientated, the attachment bar having:
        a first end, the first end sized to be sandwiched between the king pin and the gooseneck hitch; and
        a second end, the second opposite the first end;
    a extension arm, the extension arm affixed to the attachment arm second end, the extension arm inclined from the attachment bar, the extension arm having:
        a first extension end, the first extension end affixed to the second end; and
        a second extension end, the second extension end opposite the first extension end;

a hinge, the hinge connecting the attachment bar and the extension arm; and a hoist, the hoist attached to the second extension end, the hoist having a cable, the cable having a free end and an attached end, the attached end affixed to the hoist, wherein the cable can be attached to a fifth wheel hitch and manipulated using the hoist.

* * * * *